United States Patent
Hsieh et al.

(10) Patent No.: US 9,612,475 B2
(45) Date of Patent: Apr. 4, 2017

(54) FRONT LIGHT MODULE AND ELECTRONIC PAPER DISPLAY DEVICE HAVING THE SAME

(71) Applicant: E Ink Holdings Inc., Hsinchu (TW)

(72) Inventors: Yun-Nan Hsieh, Hsinchu (TW); Cheng-Hsien Lin, Hsinchu (TW); Lin-An Chen, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 4 days.

(21) Appl. No.: 14/499,224

(22) Filed: Sep. 28, 2014

(65) Prior Publication Data
US 2015/0226906 A1 Aug. 13, 2015

(30) Foreign Application Priority Data
Feb. 12, 2014 (TW) .............................. 103104618 A

(51) Int. Cl.
*G02B 26/00* (2006.01)
*G02F 1/03* (2006.01)
(Continued)

(52) U.S. Cl.
CPC ........... *G02F 1/1336* (2013.01); *G02B 6/005* (2013.01); *G02F 1/167* (2013.01); *G02B 6/006* (2013.01);
(Continued)

(58) Field of Classification Search
CPC .... G02F 1/167; G02F 2001/1678; G02F 1/03; G02F 1/133; G02F 1/061; G02B 26/26; G02B 26/00; G02B 26/08
(Continued)

(56) References Cited

U.S. PATENT DOCUMENTS 6,814,452 B2 11/2004 Kusuda
8,147,115 B2 4/2012 Kiyose
(Continued)

FOREIGN PATENT DOCUMENTS

CN 201698377 U 1/2011
CN 102254455 A 11/2011
(Continued)

OTHER PUBLICATIONS

Corresponding Taiwanese Office Action that these art references were cited on Jun. 11, 2015.

*Primary Examiner* — Dawayne A Pinkney
(74) *Attorney, Agent, or Firm* — CKC & Partners Co., Ltd.

(57) ABSTRACT

The front light module includes a light guide plate, a light source, a first light transmissive substrate, a second light transmissive substrate, and a printing ink layer. The light guide plate has a first light emitting surface, a second light emitting surface, and a light incident surface. The light source faces the light incident surface. The first light transmissive substrate is located on the first light emitting surface. The second light transmissive substrate is located on the surface of the first light transmissive substrate facing away from the light guide plate, and the thickness of the second light transmissive substrate is smaller than that of the first light transmissive substrate. The printing ink layer is located on the surface of the second light transmissive substrate facing the first light transmissive substrate, and on an edge of the second light transmissive substrate.

17 Claims, 4 Drawing Sheets

(51) Int. Cl.
*G02F 1/133* (2006.01)
*G09G 3/19* (2006.01)
*G03G 17/04* (2006.01)
*G02F 1/1335* (2006.01)
*G02F 1/167* (2006.01)
*F21V 8/00* (2006.01)

(52) U.S. Cl.
CPC .......... *G02B 6/0043* (2013.01); *G02B 6/0065* (2013.01); *G02F 2001/133616* (2013.01)

(58) Field of Classification Search
USPC ........ 359/296, 253–254, 245, 290–291, 298; 349/33; 345/49, 105, 107; 430/31–32
See application file for complete search history.

(56) References Cited

U.S. PATENT DOCUMENTS

| | | | |
|---|---|---|---|
| 2003/0035198 A1* | 2/2003 | Liang et al. | 359/296 |
| 2004/0145562 A1* | 7/2004 | Horikiri | 345/107 |
| 2009/0154198 A1* | 6/2009 | Lee | G02B 6/0081 362/624 |
| 2010/0283717 A1* | 11/2010 | Oka et al. | 345/102 |
| 2011/0193874 A1 | 8/2011 | Jung et al. | |
| 2013/0063676 A1* | 3/2013 | Tsuchihashi | G02F 1/13318 349/54 |

FOREIGN PATENT DOCUMENTS

| | | |
|---|---|---|
| CN | 102998828 A | 3/2013 |
| CN | 202975552 U | 6/2013 |
| CN | 203217213 U | 9/2013 |
| CN | 103331984 A | 10/2013 |
| TW | 201205530 A | 2/2012 |
| TW | 201241687 A | 10/2012 |

\* cited by examiner

FRONT LIGHT MODULE AND ELECTRONIC PAPER DISPLAY DEVICE HAVING THE SAME

RELATED APPLICATIONS

This application claims priority to Taiwanese Application Serial Number 103104618, filed Feb. 12, 2014, which is herein incorporated by reference.

BACKGROUND

Field of Invention

The present invention relates to a front light module and an electronic paper display device.

Description of Related Art

In the market full of a wide variety of consumer electronic products, portable electronic devices, e.g. an electronic book, now have extensively utilized electronic paper display devices as display screens. A display medium layer (also referred to as an electronic ink) of an electronic paper display device is mainly made of an electrophoresis buffer and white and black charged particles doped in the electrophoresis buffer. The white and black charged particles are movable driven by applying a voltage to the display medium layer, so as to present individual pixel with black, white or a gray level.

In the present technology, the electronic paper display device utilizes an incident light that irradiates the display medium layer to achieve the purpose of display. Therefore, the electronic paper display device needs no backlight, which reduces the power consumption of the electronic paper display device. In order to expand the application of the electronic paper display device, a front light module is often arranged above the front panel laminate of the electronic paper display device. Even if the electronic paper display device is used in a place with insufficient ambient light, the front light module may emit an incident light to the display medium layer. As such, users can see the images displayed by the electronic paper display device.

The conventional front light module of the electronic paper display device may consist of a light source, a light guide plate, and a light transmissive protection cover having an ink layer printed thereon. The surface of the light transmissive protection cover having the ink layer is adhered to the light guide plate. The ink layer is printed on the edge of the light transmissive protection cover to be a frame for shielding light. However, the light emitted by the light source is guided to the external surface of the light transmissive protection cover. The perpendicular distance between the external surface of the light transmissive protection cover and the ink layer is so far that the light is apt to be reflected to the ink layer by the external surface of the light transmissive protection cover, resulting in and the fluorescent illumination and visual interference. In this regard, only a dark (e.g., black) ink layer is optional to reduce the influence of the fluorescent illumination. The limitation in choosing the colors of the ink layer restricts the change in the color of the housing of the electronic paper display device. On the other hand, an additional air gap may be used to change the refraction direction of the light, which however scarifies the transmittance of the front light module.

SUMMARY

An aspect of the present invention is to provide a front light module used in a display device.

According to an embodiment of the present invention, a front light module includes a light guide plate, a light source, a first light transmissive substrate, a second light transmissive substrate, and a printing ink layer. The light guide plate has a first light emitting surface, a second light emitting surface opposite to the first light emitting surface, and a light incident surface between the first and second light emitting surfaces. The light source faces the light incident surface of the light guide plate. The first light transmissive substrate is located on the first light emitting surface of the light guide plate. The second light transmissive substrate is located on the surface of the first light transmissive substrate facing away from the light guide plate. The thickness of the second light transmissive substrate is smaller than the thickness of the first light transmissive substrate. The printing ink layer is located on the surface of the second light transmissive substrate facing the first light transmissive substrate, and on the edge of the second light transmissive substrate.

In one embodiment of the present invention, the front light module further includes a first adhesion layer. The first adhesion layer is between the light guide plate and the first light transmissive substrate.

In one embodiment of the present invention, the front light module further includes a second adhesion layer. The second adhesion layer is between the first and second light transmissive substrates, such that the second light transmissive substrate and the printing ink layer are adhered to the first light transmissive substrate.

In one embodiment of the present invention, the total thickness of the second light transmissive substrate and the printing ink layer is in a range from 1% to 25% of the total thickness of the first light transmissive substrate, the second adhesion layer, the printing ink layer, and the second light transmissive substrate.

In one embodiment of the present invention, the front light module further includes an overcoat layer. The overcoat layer covers the printing ink layer and the surface of the second light transmissive substrate facing the first light transmissive substrate. The second adhesion layer is between the overcoat layer and the first light transmissive substrate.

In one embodiment of the present invention, the total thickness of the second light transmissive substrate and the printing ink layer is in a range from 1% to 25% of the total thickness of the first light transmissive substrate, the second adhesion layer, the overcoat layer, the printing ink layer, and the second light transmissive substrate.

In one embodiment of the present invention, the first light transmissive substrate is made of a material comprising one of polycarbonate, polymethyl methacrylate, glass, and a combination thereof.

In one embodiment of the present invention, the second light transmissive substrate is made of a material including polyethylene terephthalate.

In one embodiment of the present invention, the thickness of the first light transmissive substrate is in a range from 0.4 to 1.2 mm.

In one embodiment of the present invention, the thickness of the second light transmissive substrate is in a range from 0.1 to 0.2 mm.

Another aspect of the present invention is to provide an electronic paper display device.

According to an embodiment of the present invention, an electronic paper display device includes a display module and a front light module. The display module includes a driving array substrate and a front panel laminate. The front panel laminate is located on the driving array substrate and includes a protection substrate and a display medium layer. The display medium layer is between the driving array substrate and the protection substrate. The front light module is located on the display module and includes a light guide plate, a light source, a first light transmissive substrate, a second light transmissive substrate, and a printing ink. The light guide plate has a first light emitting surface, a second light emitting surface opposite to the first light emitting surface, and a light incident surface between the first and second light emitting surfaces. The second light emitting surface is located on the display module. The light source faces the light incident surface of the light guide plate. The first light transmissive substrate is located on the first light emitting surface of the light guide plate. The second light transmissive substrate is located on the surface of the first light transmissive substrate facing away from the light guide plate. The thickness of the second light transmissive substrate is smaller than the thickness of the first light transmissive substrate. The printing ink layer is located on the surface of the second light transmissive substrate facing the first light transmissive substrate, and on the edge of the second light transmissive substrate.

In the aforementioned embodiments of the present invention, the front light module has the first and second light transmissive substrates, and the first light transmissive substrate may provide a supporting force for the front light module. Therefore, the thickness of the second light transmissive substrate may be reduced. As a result, the perpendicular distance between the printing ink on the second transmissive substrate and the surface of the second transmissive substrate facing away from the first transmissive substrate may be reduced, such that the light is not easily reflected to the printing ink by the second transmissive substrate. Therefore, when the front light module of the present invention is in use, fluorescent light is not easily apt to be found above the printing ink layer, such that the disturbance of the sense of sight may be prevented. Moreover, the printing ink layer with a dark color (e.g., a black color) or a light color (e.g., a white color) may be selectively used in the front light module to correspond to the appearance design (e.g., the housing color) of the electronic paper display device, such that the color of the printing ink layer is in an adjustable manner.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
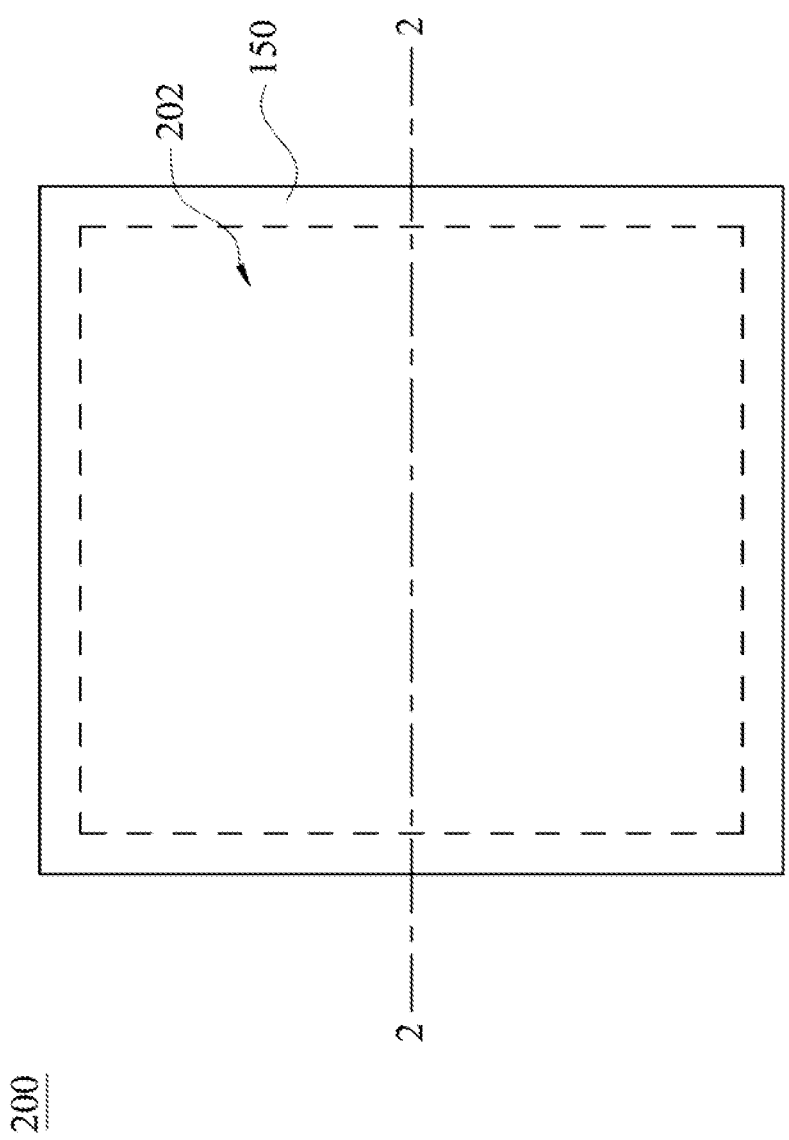
FIG. 1 is a top view of an electronic paper display device according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 2:
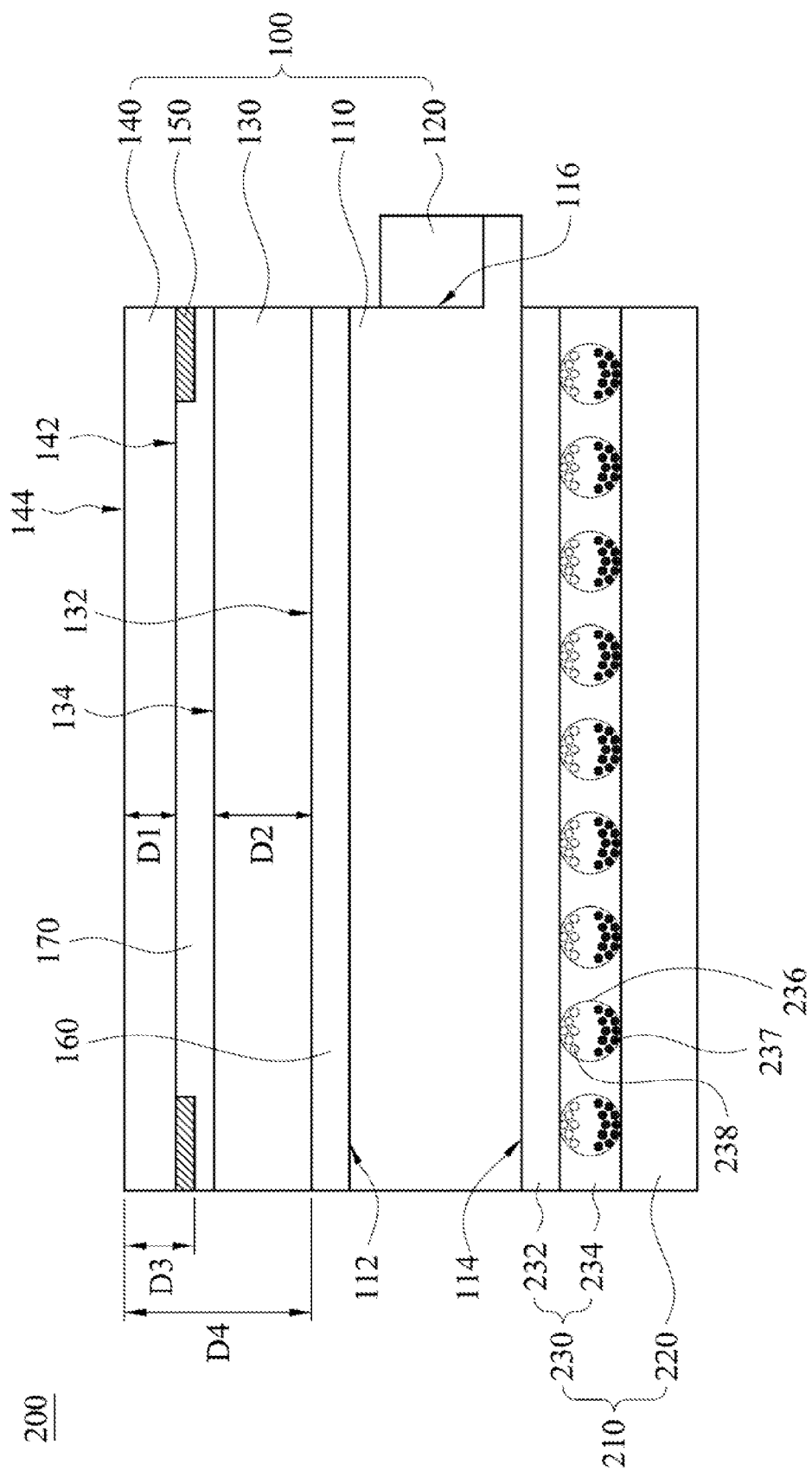
FIG. 2 is a cross-sectional view of the electronic paper display device taken along line 2-2 shown in FIG. 1.

FIG. 1 is a top view of an electronic paper display device 200 according to an embodiment of the present invention. FIG. 2 is a cross-sectional view of the electronic paper display device 200 taken along line 2-2 shown in FIG. 1. As shown in FIG. 1 and FIG. 2, the electronic paper display device 200 includes a display module 210 and a front light module 100. The front light module 100 is located on the display module 210 and includes a light guide plate 110, a light source 120, a first light transmissive substrate 130, a second light transmissive substrate 140, and a printing ink layer 150. The light guide plate 110 has a first light emitting surface 112, a second light emitting surface 114 opposite to the first light emitting surface 112, and a light incident surface 116 between the first and second light emitting surfaces 112, 114. The light source 120 is adjacent to and faces the light incident surface 116 of the light guide plate 110. The first light transmissive substrate 130 is located on the first light emitting surface 112 of the light guide plate 110 and has opposite surfaces 132, 134. The second light transmissive substrate 140 is located on the surface 134 of the first light transmissive substrate 130 facing away from the light guide plate 110. The second light transmissive substrate 140 has opposite surfaces 142, 144.

In this embodiment, the printing ink layer 150 is located on the surface 142 of the second light transmissive substrate 140 facing the first light transmissive substrate 130. The printing ink layer 150 is located on the edge of the second light transmissive substrate 140 to be as a frame for shielding light, such that the display area 202 of the electronic paper display device 200 (i.e., the inner area of the dotted line shown in FIG. 1) may be defined by the printing ink layer 150. The pattern of the aforesaid printing ink layer 150 may be other irregular pattern or include plural patterns with different colors for broadening the application of the printing ink layer 150. For example, the printing ink layer 150 may be a logo or an aesthetic pattern with different colors.

The front light module 100 has the first and second light transmissive substrates 130, 140, and the first light transmissive substrate 130 may provide a supporting force for the front light module 100 and protect the light guide plate 110. Therefore, the thickness D1 of the second light transmissive substrate 140 may be reduced, such that the thickness D1 of the second light transmissive substrate 140 may be smaller than the thickness D2 of the first light transmissive substrate 130. As a result, the perpendicular distance between the printing ink layer 150 on the second transmissive substrate 140 and the surface 144 of the second transmissive substrate 140 (i.e., the thickness D1) may be reduced.

In this embodiment, the front light module 100 further includes a first adhesion layer 160 and a second adhesion layer 170. The first adhesion layer 160 is between the light guide plate 110 and the first light transmissive substrate 130, such that the first light transmissive substrate 130 is adhered to the light guide plate 110. The second adhesion layer 170 is between the first and second light transmissive substrates 130, 140, such that the second light transmissive substrate 140 and the printing ink layer 150 are adhered to the first light transmissive substrate 130. The total thickness D3 of the second light transmissive substrate 140 and the printing ink layer 150 is in a range from 1% to 25% of the total thickness D4 of the first light transmissive substrate 130, the second adhesion layer 170, the printing ink layer 150, and the second light transmissive substrate 140.

When the front light module 100 is manufactured, the printing ink layer 150 may be printed on the surface 142 of the second light transmissive substrate 140, and subsequently the first light transmissive substrate 130 may be adhered to the light guide plate 110 by the first adhesion layer 160. Finally, the second light transmissive substrate 140 having the printing ink layer 150 may be adhered to the surface 134 of the first light transmissive substrate 130 by the second adhesion layer 170.

However, the aforesaid sequence does not limit the present invention. For example, the second light transmissive substrate 140 having the printing ink layer 150 may be adhered to the surface 134 of the first light transmissive substrate 130 by the second adhesion layer 170, and subsequently the first light transmissive substrate 130 is adhered to the light guide plate 110 by the first adhesion layer 160.

In this embodiment, the first light transmissive substrate 130 may be made of a material comprising polycarbonate (PC), polymethyl methacrylate (PMMA), glass, or a combination thereof, and the thickness D2 of the first light transmissive substrate 130 may be in a range from 0.4 to 1.2 mm. The second light transmissive substrate 140 may be made of a material including polyethylene terephthalate (PET), and the thickness D1 of the second light transmissive substrate 140 may be in a range from 0.1 to 0.2 mm. When the thickness D2 of the first light transmissive substrate 130 is increasingly thicker, the thickness difference between the thickness D2 of the first light transmissive substrate 130 and the thickness D1 of the second light transmissive substrate 140 is larger, such that the utility of reducing the fluorescent light that generates above the printing ink layer 150 is increasingly more obvious.

The display module 210 includes a driving array substrate 220 and a front panel laminate 230. The front panel laminate 230 is located on the driving array substrate 220. The front panel laminate 230 includes a protection substrate 232 and a display medium layer 234. The display medium layer 234 is between the driving array substrate 220 and the protection substrate 232. The second light emitting surface 114 of the light guide plate 110 is located on the display module 210. Moreover, the front light module 100 is used in the display device 200, but the present invention is not limited in this regard, other display modules that need front light may also utilize the front light module 100.

In the following description, the state of the light in the display device 200 when the light source 120 emits light will be described.

Figure 3:
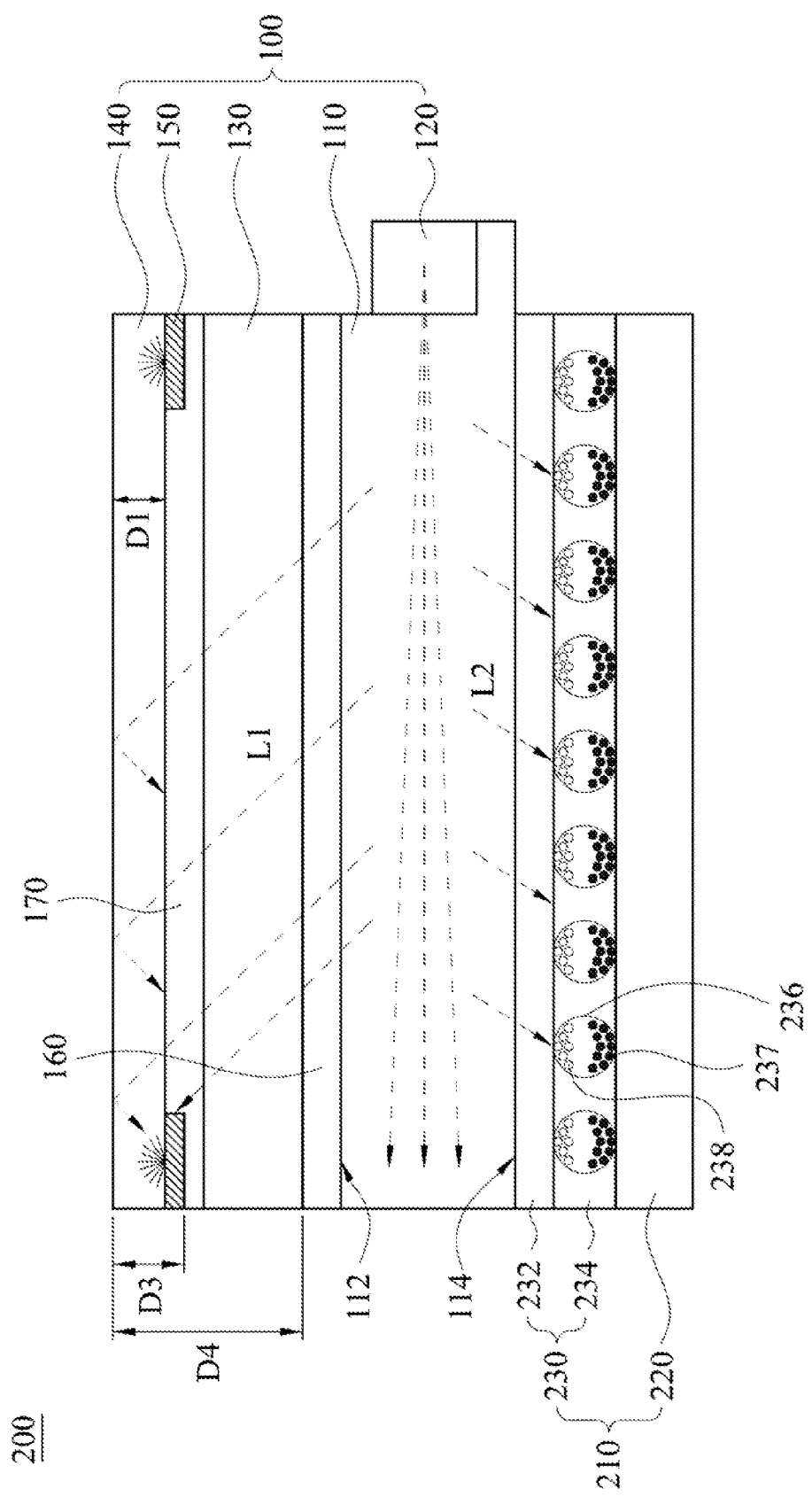
FIG. 3 is a schematic view of a light source shown in FIG. 2 when the light source emits light.

FIG. 3 is a schematic view of the light source 120 shown in FIG. 2 when the light source 120 emits light. As shown in FIG. 3, when the light source 120 emits light, the light L1 may pass outward the first light emitting surface 112 of the light guide plate 110, and the light L2 may pass outward the second light emitting surface 114 of the light guide plate 110. The thickness D1 of the second light transmissive substrate 140 is small. For example, the total thickness D3 of the second light transmissive substrate 140 and the printing ink layer 150 is 20% of the total thickness D4 of the first light transmissive substrate 130, the second adhesion layer 170, the printing ink layer 150, and the second light transmissive substrate 140. Therefore, the light L1 is not easily reflected to the printing ink layer 150 by the second light transmissive substrate 140. As a result, when the front light module 100 is in use, fluorescent light is not easily apt to be found above the printing ink layer 150, such that the image of the display area 202 (see. FIG. 1) does not suffer the disturbance of the sense of sight caused by the fluorescent light of the printing ink layer 150. That is to say, an additional air gap does not need to be used in the front light module 100 to reduce the light L1 reflected to the printing ink layer 150. Therefore, the transmittance of the front light module 100 may be improved.

Moreover, since the front light module 100 may reduce the light L1 reflected to the printing ink layer 150, designers may selectively use the printing ink layer 150 with a dark color (e.g. a black color) or a light color (e.g., a white color) to correspond to the appearance design (e.g., the housing color) of the electronic paper display device 200. As a result, the color of the printing ink layer 150 is in an adjustable manner.

In this embodiment, the display medium layer 234 includes plural microencapsules 236. Each of the microencapsules 236 includes plural dark electrophoretic particles 237 and plural electrophoretic particles 238. When the light source 120 emits light, the light L2 emitted from the second light emitting surface 114 of the light guide plate 110 may enter the display medium layer 234. When the bright electrophoretic particles 238 are near the upper side of the microencapsules 236, and the dark electrophoretic particles 237 are near the lower side of the microencapsules 236, the display module 210 can reflect the light L2 so as to display as a bright surface in the area of the microencapsules 236. On the other hand, when the bright electrophoretic particles 238 are near the lower side of the microencapsules 236, and the dark electrophoretic particles 237 are near the upper side of the microencapsules 236, the display module 210 does not reflect the light L2 so as to display as a dark surface in the area of the microencapsules 236.

It is to be noted that the connection relationships and the materials of the elements described above will not be repeated in the following description. In the following description, other types of the front light module will be described.

Figure 4:
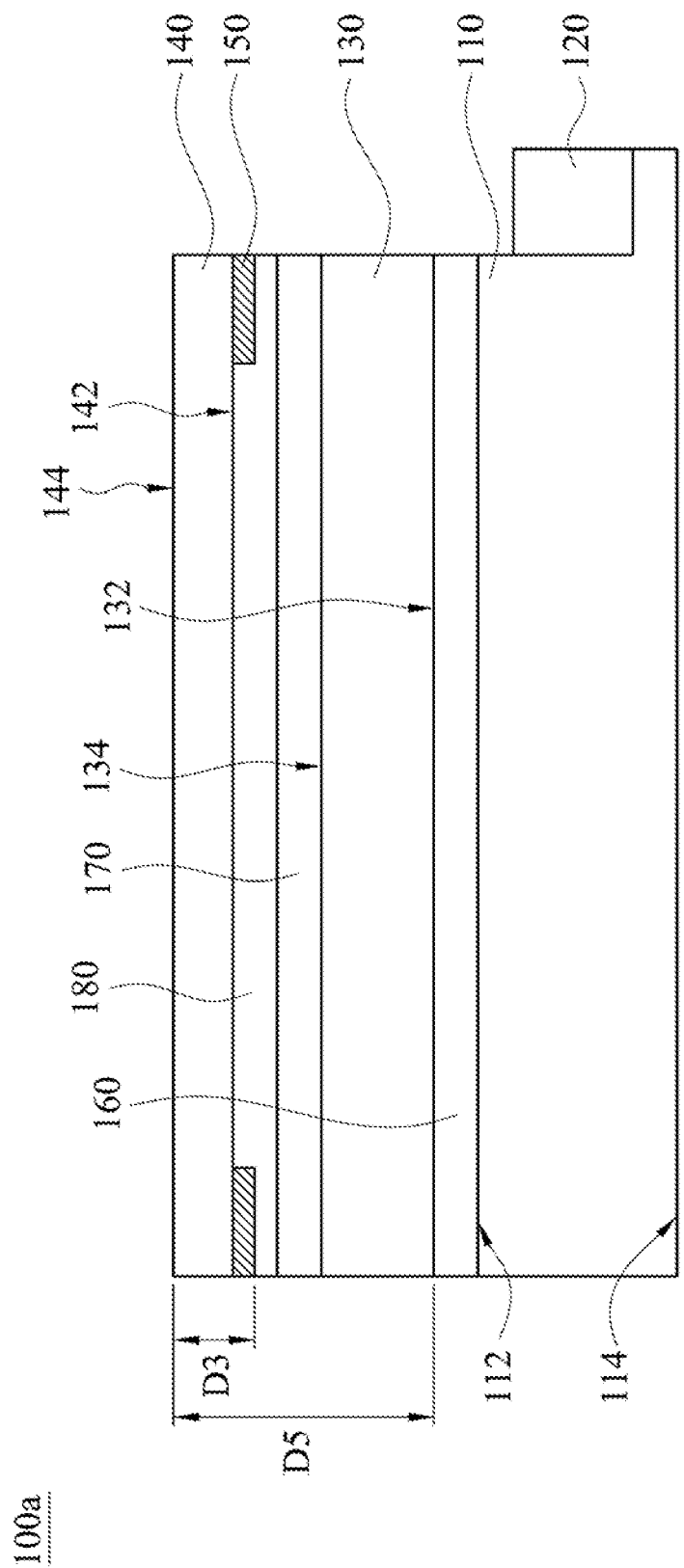
FIG. 4 is a cross-sectional view of a front light module according to an embodiment of the present invention.

FIG. 4 is a cross-sectional view of a front light module 100a according to an embodiment of the present invention. As shown in FIG. 4 the front light module 100a includes the light guide plate 110, the light source 120, the first light transmissive substrate 130, the second light transmissive substrate 140, and the printing ink layer 150. The difference between this embodiment and the embodiment show in FIG. 2 is that the front light module 100a further includes an overcoat (OC) layer 180. The overcoat layer 180 covers the printing ink layer 150 and the surface 142 of the second light transmissive substrate 140 facing the first light transmissive substrate 130, and the second adhesion layer 170 is between the overcoat layer 180 and the first light transmissive substrate 130. The overcoat layer 180 may be made of a material including ultraviolet curable material, but the present invention is not limited in this regard.

In this embodiment, the total thickness D3 of the second light transmissive substrate 140 and the printing ink layer 150 is in a range from 1% to 25% of the total thickness D5 of the first light transmissive substrate 130, the second adhesion layer 170, the overcoat layer 180, the printing ink layer 150, and the second light transmissive substrate 140.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A front light module for a display device having a display area, the front light module comprising:
    a light guide plate having a first light emitting surface, a second light emitting surface opposite to the first light emitting surface, and a light incident surface between the first and second light emitting surfaces;
    a light source facing the light incident surface of the light guide plate;
    a first light transmissive substrate located on the first light emitting surface of the light guide plate;
    a second light transmissive substrate located on a surface of the first light transmissive substrate facing away from the light guide plate, wherein a thickness of the second light transmissive substrate is smaller than a thickness of the first light transmissive substrate; the first and second light transmissive substrates are stacked at the same side of the light guide plate, such that the first light transmissive substrate is between the second light transmissive substrate and the light guide plate;
    a printing ink layer located on a surface of the second light transmissive substrate facing the first light transmissive substrate, wherein the printing ink layer surrounds an edge of the surface of the second light transmissive substrate for shielding light, such that the display area is defined by the printing ink layer; the printing ink layer has a bottom surface that faces away from the surface of the second light transmissive substrate, and has a side surface that is adjacent to the bottom surface and the second light transmissive substrate; and
    a first adhesion layer between the first and second light transmissive substrates and in contact with the bottom surface and the side surface of the printing ink layer, and covering the printing ink layer.

2. The front light module of claim 1, further comprising:
    a second adhesion layer between the light guide plate and the first light transmissive substrate.

3. The front light module of claim 1, wherein a total thickness of the second light transmissive substrate and the printing ink layer is in a range from 1% to 25% of a total thickness of the first light transmissive substrate, the first adhesion layer, the printing ink layer, and the second light transmissive substrate.

4. The front light module of claim 1, wherein the first light transmissive substrate is made of a material comprising one of polycarbonate, polymethyl methacrylate, glass, and a combination thereof.

5. The front light module of claim 1, wherein the second light transmissive substrate is made of a material comprising polyethylene terephthalate.

6. The front light module of claim 1, wherein a thickness of the first light transmissive substrate is in a range from 0.4 to 1.2 mm.

7. The front light module of claim 1, wherein a thickness of the second light transmissive substrate is in a range from 0.1 to 0.2 mm.

8. An electronic paper display device having a display area, comprising:
    a display module comprising:
        a driving array substrate; and
        a front panel laminate located on the driving array substrate and the front panel laminate comprising a protection substrate and a display medium layer, wherein the display medium layer is between the driving array substrate and the protection substrate; and
    a front light module located on the display module and the front light module comprising:
        a light guide plate having a first light emitting surface, a second light emitting surface opposite to the first light emitting surface, and a light incident surface between the first and second light emitting surfaces, wherein the second light emitting surface is located on the display module;
        a light source facing the light incident surface of the light guide plate;
        a first light transmissive substrate located on the first light emitting surface of the light guide plate;
        a second light transmissive substrate located on a surface of the first light transmissive substrate facing away from the light guide plate, wherein a thickness of the second light transmissive substrate is smaller than a thickness of the first light transmissive substrate; the first and second light transmissive substrates are stacked at the same side of the light guide plate, such that the first light transmissive substrate is between the second light transmissive substrate and the light guide plate;
        a printing ink layer located on a surface of the second light transmissive substrate facing the first light transmissive substrate, wherein the printing ink layer surrounds an edge of the surface of the second light transmissive substrate for shielding light, such that the display area is defined by the printing ink layer; the printing ink layer has a bottom surface that faces away from the surface of the second light transmissive substrate, and has a side surface that is adjacent to the bottom surface and the second light transmissive substrate; and
        a first adhesion layer between the first and second light transmissive substrates and in contact with the bottom surface and the side surface of the printing ink layer, and covering the printing ink layer.

9. The electronic paper display device of claim 8, wherein the front light module further comprises:
    a second adhesion layer between the light guide plate and the first light transmissive substrate.

10. The electronic paper display device of claim 8, wherein a total thickness of the second light transmissive substrate and the printing ink layer is in a range from 1% to 25% of a total thickness of the first light transmissive substrate, the first adhesion layer, the printing ink layer, and the second light transmissive substrate.

11. The electronic paper display device of claim 8, wherein the first light transmissive substrate is made of a material comprising one of polycarbonate, polymethyl methacrylate, glass, and a combination thereof.

12. The electronic paper display device of claim 8, wherein the second light transmissive substrate is made of a material comprising polyethylene terephthalate.

13. The electronic paper display device of claim 8, wherein a thickness of the first light transmissive substrate is in a range from 0.4 to 1.2 mm.

14. The electronic paper display device of claim 8, wherein a thickness of the second light transmissive substrate is in a range from 0.1 to 0.2 mm.

15. A front light module for a display device having a display area, the front light module comprising:
    a light guide plate having a first light emitting surface, a second light emitting surface opposite to the first light emitting surface, and a light incident surface between the first and second light emitting surfaces;

a light source facing the light incident surface of the light guide plate;

a first light transmissive substrate located on the first light emitting surface of the light guide plate;

a second light transmissive substrate located on a surface of the first light transmissive substrate facing away from the light guide plate, wherein a thickness of the second light transmissive substrate is smaller than a thickness of the first light transmissive substrate; the first and second light transmissive substrates are stacked at the same side of the light guide plate, such that the first light transmissive substrate is between the second light transmissive substrate and the light guide plate;

a printing ink layer located on a surface of the second light transmissive substrate facing the first light transmissive substrate, wherein the printing ink layer surrounds an edge of the surface of the second light transmissive substrate for shielding light, such that the display area is defined by the printing ink layer, the printing ink layer has a bottom surface that faces away from the second light transmissive substrate, and has a side surface that is adjacent to the bottom surface and the second light transmissive substrate;

an overcoat layer in contact with the bottom surface and the side surface of the printing ink layer and covering the printing ink layer; and an adhesion layer between the overcoat layer and the first light transmissive substrate.

16. The front light module of claim 15, wherein a total thickness of the second light transmissive substrate and the printing ink layer is in a range from 1% to 25% of a total thickness of the first light transmissive substrate, the adhesion layer, the overcoat layer, the printing ink layer, and the second light transmissive substrate.

17. A front light module for a display device having a display area, the front light module comprising:

a light guide plate having a first light emitting surface, a second light emitting surface opposite to the first light emitting surface, and a light incident surface between the first and second light emitting surfaces;

a light source facing the light incident surface of the light guide plate;

a first light transmissive substrate located on the first light emitting surface of the light guide plate;

a second light transmissive substrate located on a surface of the first light transmissive substrate facing away from the light guide plate, wherein a thickness of the second light transmissive substrate is smaller than a thickness of the first light transmissive substrate; the first and second light transmissive substrates are stacked at the same side of the light guide plate, such that the first light transmissive substrate is between the second light transmissive substrate and the light guide plate;

a printing ink layer located on a surface of the second light transmissive substrate facing the first light transmissive substrate, wherein the printing ink layer surrounds an edge of the surface of the second light transmissive substrate for shielding light, such that the display area is defined by the printing ink layer;

an adhesion layer between the first and second light transmissive substrates, wherein a total thickness of the second light transmissive substrate and the printing ink layer is in a range from 1% to 25% of a total thickness of the first light transmissive substrate, the adhesion layer, the printing ink layer, and the second light transmissive substrate.

* * * * *